UNITED STATES PATENT OFFICE.

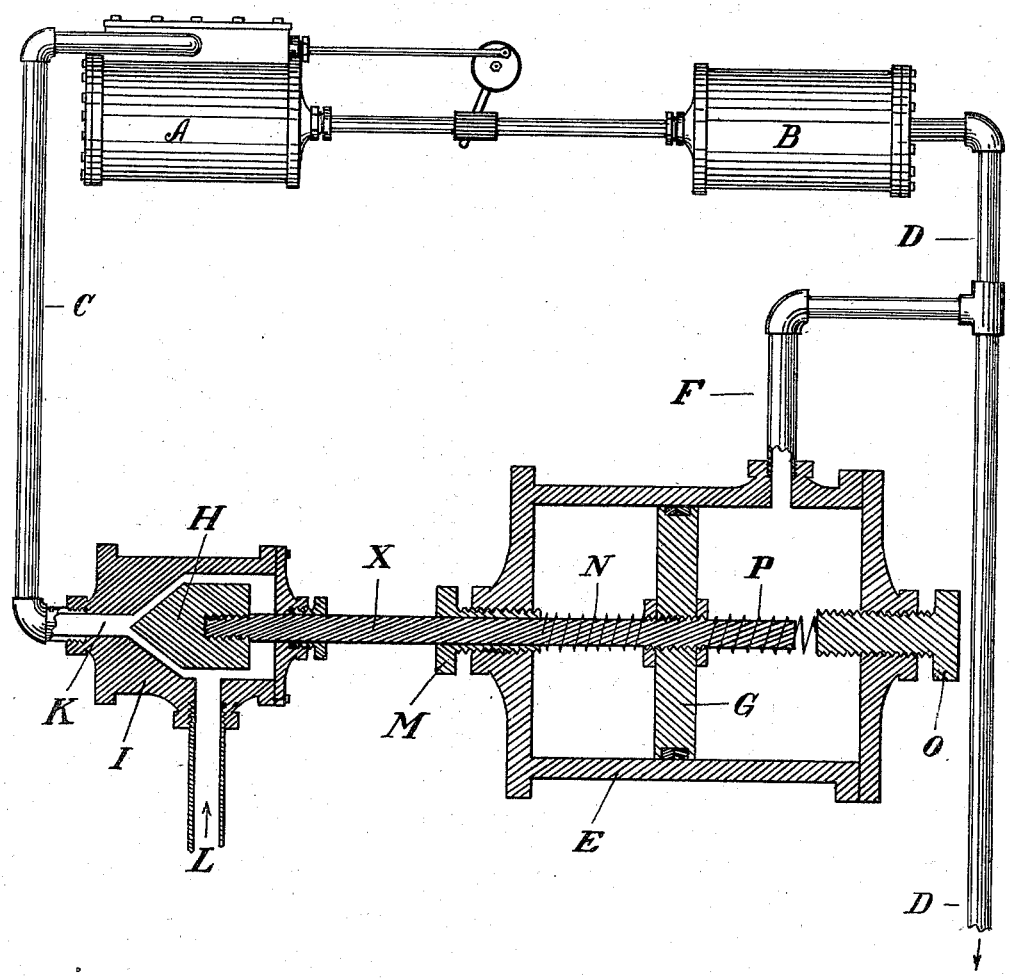

WILLIAM MOYER, OF LYKENS, PENNSYLVANIA.

AIR-COMPRESSOR.

SPECIFICATION forming part of Letters Patent No. 541,979, dated July 2, 1895.

Application filed July 19, 1894. Serial No. 518,049. (No model.)

*To all whom it may concern:*

Be it known that I, WILLIAM MOYER, a citizen of the United States, residing at Lykens, in the county of Dauphin and State of Pennsylvania, have invented certain new and useful Improvements in Air-Compressors, of which the following is a specification.

My invention relates to certain new and useful improvements in beer-pumps and pumps for similar purposes where the maintenance of a constant pressure of air or other fluid is required.

It has for its object to provide a pump that shall be entirely automatic in its action, and one that shall maintain a constant air-pressure, the degree of which can be easily regulated to suit different requirements. In the attainment of this object I have devised the construction and arrangement of parts illustrated in the accompanying drawing, which shows a general view of my improved pump, the automatic cut-off mechanism being made prominent and shown in section, so as to clearly reveal its construction.

In serving beer and similar beverages from a keg or other receptacle it is desirable as it is drawn off to restore the original pressure, in order that the beer may not lose its effervescent properties and become stale.

In the drawing, A is the water-cylinder and B the air-cylinder of an air-compressing pump.

C is the water-supply pipe for carrying water under pressure to the water-cylinder for actuating the pump.

D is the air-delivery pipe, conveying the air from the air-cylinder, under pressure, to the keg or other point of consumption.

E is the air-cylinder of my automatic cut-off mechanism. Air is supplied to it, under pressure, through the branch pipe F, leading from the air-delivery pipe D.

G is a piston working within the cylinder E. The stem X of this piston terminates in a conical valve-head H, which is adapted to work within a valve-chamber I, provided with a suitable valve-seat, so as to open or close the water-supply exit K.

L is the water-supply inlet-pipe, furnishing water under pressure to the valve-chamber I.

Returning now to the air-cylinder of the automatic cut-off, M is an adjusting-sleeve fitting round the piston-stem X and threaded within the forward cylinder-head, as shown, so as to be advanced within the cylinder, or retracted, by turning.

N is a coiled spring encircling the piston-stem within the cylinder and bearing against the piston-head G and the inner end of the adjusting-sleeve M.

O is an adjusting-screw similarly threaded within the rear cylinder-head, and P is a coiled spring bearing between the said adjusting-screw O and the piston-head G, as shown.

The various parts of my invention being constructed and arranged as described, their operation is as follows: The water-passage through the valve-chamber I being open, as shown in the drawing, water under pressure from the source of supply is admitted to the water-cylinder A of the pump. This sets the pump in operation, and air is delivered under pressure from the air-cylinder B through the air-delivery pipe D. The pressure of the air from the branch pipe F, acting on the piston-head G within the air-cylinder E of the cut-off mechanism, tends to advance the piston-stem X and the valve-head H. Finally, the pressure having reached a certain predetermined point, the valve-head H is closed tight into its seat, the water-supply is entirely cut off from the water-cylinder A, and the air-pump stops. When beer is drawn from the keg or the pressure is through any other means to any extent relaxed, the coiled spring N forces back the piston-head G somewhat, the water-supply exit at K is opened, and the pump is again set in motion, continuing to act until the normal pressure is again established. Now, if I desire to increase the degree of this normal pressure, I screw the adjusting-sleeve M a little farther inward and retract the other adjusting-screw O. This opens the water-supply exit at K a little wider, and accordingly it will take a higher pressure on the piston-head G to cut off the water-supply and stop the pump. By screwing in O and unscrewing M the degree of the normal pressure may, on the other hand, be reduced as desired. Thus by a simple adjustment I am able to vary the pressure as the conditions may demand.

Having thus described my invention, what I claim, and desire to secure by Letters Patent, is—

1. In apparatus for maintaining a constant pressure of air, the combination with an air compressor, of a cylinder in communication with the compressed air supply, a piston reciprocating within said cylinder, an adjustable spring on each side of the piston for regulating the normal position of the piston, and means connected with the piston for controlling the supply of power to the compressor.

2. A fluid pressure regulator consisting of a cylinder E, in communication with the source of pressure, a piston G reciprocating therein, adjusting screws M and O oppositely disposed with reference to the piston, springs N and P interposed between said adjusting screws respectively and the piston, and means connected with the piston adapted to control the source of pressure.

3. In apparatus for maintaining a constant pressure of air, an air compressor actuated by water pressure, and a cut-off interposed between the water supply and the air delivery; said cut-off consisting of the cylinder E, in communication with the air delivery, the piston G reciprocating therein, the piston stem X terminating in the valve head H within the valve chamber I, said valve head H being adapted to close the water supply exit K; the adjusting sleeve M surrounding the piston stem X and adapted to screw into the forward head of the cylinder E, the spring N interposed between the sleeve M and the piston head G; the adjusting screw O adapted to screw into the rear head of the cylinder E, and the spring P interposed between said adjusting screw and the piston head, all substantially as shown and described.

WILLIAM MOYER.

Witnesses:
CHAS. M. MOYER,
JOHN A. MOYER.